US011327184B2

(12) United States Patent
Takac et al.

(10) Patent No.: US 11,327,184 B2
(45) Date of Patent: May 10, 2022

(54) PROVIDING ATMOSPHERIC CORRECTION DATA FOR A GNSS NETWORK-RTK SYSTEM BY ENCODING THE DATA ACCORDING TO A QUAD-TREE HIERARCHY

(71) Applicant: LEICA GEOSYSTEMS AG, Heerbrugg (CH)

(72) Inventors: Frank Takac, Balgach (CH); Paul Spencer, Rorschach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 125 days.

(21) Appl. No.: 16/855,859

(22) Filed: Apr. 22, 2020

(65) Prior Publication Data

US 2020/0341154 A1  Oct. 29, 2020

(30) Foreign Application Priority Data

Apr. 23, 2019  (EP) ..................... 19170710

(51) Int. Cl.
*G01S 19/41* (2010.01)
*G01S 19/07* (2010.01)
*G01S 19/43* (2010.01)

(52) U.S. Cl.
CPC ............ *G01S 19/41* (2013.01); *G01S 19/071* (2019.08); *G01S 19/072* (2019.08); *G01S 19/43* (2013.01)

(58) Field of Classification Search
CPC ...... G01S 19/04; G01S 19/071; G01S 19/072; G01S 19/073; G01S 19/41; G01S 19/43
See application file for complete search history.

(56) References Cited

U.S. PATENT DOCUMENTS 7,031,730 B1  4/2006  Barber et al.
9,651,668 B2  5/2017  Trilles
(Continued)

FOREIGN PATENT DOCUMENTS

CN  106970404 A  7/2017
WO  2016/185500 A1  11/2016

OTHER PUBLICATIONS

"metadata." In Webster's New World™ Computer Dictionary, by Bryan Pfaffenberger. 10th ed. Houghton Mifflin Harcourt, https://search.credoreference.com/content/entry/webstercom/metadata/0, 2003 (Year: 2003).*

(Continued)

*Primary Examiner* — Bernarr E Gregory
*Assistant Examiner* — Fred H Mull
(74) *Attorney, Agent, or Firm* — Maschoff Brennan

(57) ABSTRACT

The invention relates to providing atmospheric correction data in a GNSS network-RTK system for correcting GNSS data, wherein a base triangulation that encloses at least part of the reference stations of the GNSS network-RTK system is subdivided into child triangles by means of a recursive division of parent triangles into four child triangles, synthetic data are determined for each of the child triangles based on a triangulation algorithm applied to basic data of the reference stations such that the synthetic data represent a gridded representation of the basic data, and access to correction data is provided, wherein the correction data comprise at least part of the synthetic data arranged in a quad-tree hierarchy.

18 Claims, 3 Drawing Sheets

(56) References Cited

U.S. PATENT DOCUMENTS

| | | | |
|---|---|---|---|
| 2002/0049536 A1* | 4/2002 | Gaal | G01S 19/27 |
| | | | 714/758 |
| 2013/0023282 A1* | 1/2013 | Lin | G01S 5/021 |
| | | | 455/456.1 |
| 2013/0234886 A1 | 9/2013 | Trilles et al. | |
| 2014/0292573 A1 | 10/2014 | Drescher et al. | |
| 2019/0004206 A1 | 1/2019 | Li et al. | |
| 2020/0068348 A1* | 2/2020 | Li | G01S 19/071 |
| 2021/0050925 A1* | 2/2021 | Modarres Razavi | |
| | | | H04W 12/0431 |

OTHER PUBLICATIONS

English Translation of CN 106970404 A (Year: 2021).*
Extended European Search Report dated Nov. 7, 2019 as received in Application No. 19170710.8.
Goodchild M. F. et al., "A Hierarchical Spatial Data Structure For Global Geographic Information Svstems," CVGIP: Graphical Models and Image Processing, vol. 54, Issue 1, pp. 31-44 (Jan. 1992).
Takac, F. and Zelzer, O. "The Relationship Between Network RTK Solutions MAC, VRS, PRS, FKP and i-MAX," In the Proceedings of the 21st International technical meeting of the Satellite division of the institute of Navigation, pp. 348-355 (Sep. 2008).

* cited by examiner

PROVIDING ATMOSPHERIC CORRECTION DATA FOR A GNSS NETWORK-RTK SYSTEM BY ENCODING THE DATA ACCORDING TO A QUAD-TREE HIERARCHY

CROSS-REFERENCE TO RELATED APPLICATIONS

This application claims priority to European Patent Application No. 19170710.8 filed on Apr. 23, 2019, which is incorporated herein by reference.

FIELD OF THE INVENTION

The present invention relates to a method for providing correction data in a GNSS network-RTK system according to embodiments described herein. Additionally, the present invention also relates to a network-RTK network element, a network-RTK rover, a computer program product, and a GNSS network-RTK system according to embodiments described herein.

BACKGROUND

Positioning by a global navigation satellite system (GNSS) is subject to dispersive and non-dispersive atmospheric influences on the positioning signal, e.g. wherein, as a function of varying electron density due to solar radiation and activity, the ionosphere exerts a dispersive delay on the GNSS signal exchanged between a satellite and a rover of the GNSS system, whereas the troposphere exerts non-dispersive delay on the same GNSS signal.

A network-RTK (Real Time Kinematic) system is a differential positioning technique, e.g. for providing high positioning performance in combination with GNSS positioning, wherein reference measurements based on known positions of reference stations are combined to provide corrections for the GNSS satellite signal, including correction for atmospheric biases.

For example, a GNSS network-RTK system comprises a network of reference stations whose locations are well known, wherein correction information is derived based on a comparison of GNSS positioning measurements with respect to the reference stations and the known locations of the reference stations. The network of reference stations typically bounds a region of service, e.g. a province, a country, a continent, or even the entire globe. The correction information is then transmitted, typically in real time, to one or several users of the GNSS network-RTK system in order to improve the GNSS positioning performance.

The derived correction data are valid along the ray path between the network stations and the satellites in view, i.e. for the case that the user is located at a reference station or at least in the vicinity of a reference station, whereas the quality of correction is reduced when the user is at a location further away from a reference station.

Therefore, a model is required to estimate the correction at any arbitrary point in the network.

Such models may rely on the assumption that the disturbance is spatially correlated and continuous over a region or even the globe. For example, spherical harmonics is an approach commonly applied to model the ionosphere over the entire globe. However, spherical harmonics have some disadvantages for modelling regional ionosphere that has led to the development of other modelling methods.

Many different network-RTK positioning/processing techniques are known, e.g. so-called RTK, VRS (virtual reference station), PPP (precise point positioning), PPP-AR (PPP positioning with ambiguity resolution), and PPP-RTK.

One common approach is to represent the continuous disturbance region using a, e.g. uniform, grid of values over the region of service, wherein an expected correction for a specific location is interpolated from the surrounding grid points using linear or non-linear functions, particularly based on a triangulation principle.

For example, interpolation may be based on a Delaunay-triangulation-network, e.g. as described by CN 106970404 A relating to a multi-redundant network RTK atmospheric error interpolation method for VRS processing.

By way of another example, WO 2016/185500 A1 relates to discretizing space into Delaunay triangles and discloses a method for forecasting ionosphere total electron content (TEC) and/or scintillation parameters to feed mitigation algorithms aiming at improving accuracy on GNSS precise positioning techniques (RTK, NRTK, and PPP).

U.S. Pat. No. 9,651,668 B2 relates to another possible interpolation approach commonly referred to as the TRIN model (TRiangular INterpolation), wherein the ionosphere is likened to a thin layer around the terrestrial globe, in which the entire electron charge of the ionosphere is accumulated. The model is constructed using a basic regular polyhedron, which is refined by successive subdivision into triangular faces.

Some precise positioning techniques further require providing to the GNSS processing unit not only the atmospheric model itself but also information on the accuracy of the model. For example, US 2014/0292573 A1 relates to GNSS positioning, wherein both an ionosphere model and its accuracy are provided to an apparatus for the rover GNSS data processing in order to improve the convergence time of PPP, i.e. the waiting time for the float position solution to converge to centimeter accuracy.

In theory, i.e. given an essentially uniform and sufficiently dense distribution of available reference stations, correction data may be derived and/or provided for a region of service at an arbitrary spatial resolution. However, in practice the performance of the GNSS network-RTK system, i.e. the provision of appropriate correction data at any spatial resolution, is typically limited because of limited bandwidth for broadcasting correction data within the network-RTK system, a lack of available reference stations in some areas to sufficiently measure the atmospheric delay, and a deficiency of the model itself to represent the true behavior of the atmospheric delay.

For example, the problem of limited memory and processing power of a GPS rover is addressed by U.S. Pat. No. 7,031,730 B1. A current position of a GPS receiver is determined and a boundary is created based on the current position. One or more bands and one or more blocks of grid point correction data are analyzed in order to determine if they are within the boundary, e.g. based on latitude and longitude of individual grid points. The GPS device then purges unnecessary data and only uses appropriate ionospheric grid point corrections that lie in the boundary for correcting the initially determined current position.

However, still a large data overhead is transmitted to the GPS device, which limits the effective information content of the transmitted data for a given available bandwidth.

SUMMARY

In some embodiments, the present invention provides an improved GNSS network-RTK system which overcomes the deficiencies of the prior art, particularly to provide better access to atmospheric correction data as well as to provide an improved quality control of the correction data.

The present invention includes at least part of the features of the independent claims or one of the dependent claims. Features which further develop the invention in an alternative or advantageous manner are described in the dependent patent claims.

In some embodiments, the present invention relates to a method for providing correction data in a GNSS network-RTK system having reference stations. According to the invention, the method comprises the following steps: determining basic data with respect to the reference stations, the basic data for each of the reference stations respectively indicating influences on a signal propagation exerted by the atmosphere on a satellite signal of a GNSS associated with the respective reference station; defining a base triangulation that encloses at least part of the reference stations; subdividing the base triangulation into child triangles by means of a recursive division of parent triangles into four child triangles; determining synthetic data for each of the child triangles based on a triangulation algorithm applied to the basic data such that the synthetic data represent a gridded representation of the basic data; and providing access to correction data, wherein the correction data comprise at least part of the synthetic data arranged in a quad-tree hierarchy.

By way of example, the method is used within the framework of a network-RTK GNSS comprising a GNSS network processing facility that receives formatted raw GNSS measurements for a set of satellites plus other ancillary information from a network of three or more reference stations distributed in an area enclosed by a base triangulation. The processing facility includes a data processing module with mathematical models and algorithms for estimating measurement biases, and the processing facility feeds the measurements to the data processing module which subsequently estimates the line-of-sight atmospheric delays for each satellite and receiver in the network, carries out the recursive division of the base triangulation, determines synthetic data for each of the child triangles, and stores the synthetic data in a quad-tree hierarchy. The correction data set is then transmitted to a network-RTK rover configured for decoding the data set and for interpolating the atmospheric delay for any arbitrary point within the base triangulation using the same interpolation functions used for the initial generation of the correction data.

Quad-tree data structures are known in the field of image processing and, for example, allow the storage of image files with changing resolution or tree depth of the image pixel indexing. However, in contrast to the division into squares or rectangles used in the field of image processing, here the division is based on triangulation.

For example, the base triangulation enclosing at least part of the reference stations may be calculated or pre-defined, wherein the vertices need not correspond to coordinates of reference stations. The base triangulation forms the base level of the quad-tree. The base level is iteratively subdivided a number of times as determined by a given set of criteria, which may vary for different applications.

Providing the correction data based on a quad-tree hierarchy enables a reduction of the data volume to be broadcasted within the GNSS network-RTK system. In particular, overhead of unnecessary information is minimized thus enabling to provide appropriate correction data at a higher spatial resolution without requiring an increased bandwidth.

For example, only the coordinates of the base level need to be transmitted with the quad-tree when using a deterministic recursive division to generate the child triangles, i.e. the order of nodes for each subdivision level is also deterministic. However, a deterministic unambiguous order is not strictly required as the order may also be provided with the quad-tree.

In addition, the accuracy that can be realized for a respective tree level may also be transmitted as part of the data comprising the correction data, i.e. the correction model may provide a combination of accuracy and correction information at the same time.

In some embodiments, a variation in the spatial resolution of the correction model due to the variable distribution of reference stations and/or precision requirements can be mapped by the quad-tree without generating data overhead.

For example, the estimated precision of the interpolated correction at an arbitrary point can be inferred from the encoded precision of the quad-tree level.

An empty (0 bit) level may be used to preserve the hierarchy of subsequent levels in the tree without the overhead of encoding any correction information for that level, and wherein a single bit level may be used to define the tree hierarchy at subsequent levels without the overhead of transmitting correction information.

In some embodiments, the correction data comprise at least the coordinates of the vertices of the base triangulation.

In some embodiments, the quad-tree hierarchy provides ordering of the synthetic data into nodes and child nodes of different tree levels, wherein for each tree level each node comprises exactly four or zero child nodes, and wherein: the nodes of a first tree level comprise synthetic data corresponding to the vertices of those child triangles which were created in a first step of the recursive division; the nodes of a second or further tree level respectively comprise synthetic data corresponding to the vertices of those child triangles which were created in a second or further step of the recursive division; the synthetic data are divided into a group of valid data and a group of invalid data; and each node is partitioned into child nodes only in case at least one of its child nodes would comprise synthetic data of the group of valid data. Thus, values associated with child triangles that should not be provided in the final quad-tree can be excluded based on a set of exclusion criteria.

By way of example, the synthetic data are divided into the group of valid data and the group of invalid data by marking at least part of the synthetic data as invalid, particularly in case an uncertainty of the at least part of the synthetic data exceeds a pre-defined uncertainty threshold. For example, the uncertainty of the at least part of the synthetic data is derived based on at least one of an uncertainty in the basic data, an interpolation uncertainty of the triangulation algorithm, and a spatial distance of the child triangle corresponding to the at least part of the synthetic data to the closest reference station.

According to some embodiments, the correction data are configured such that for each child node differential data are provided with respect to data of its parent node, namely the node of the previous tree level which was partitioned into those child nodes which comprise the respective child node.

In some embodiments, the quad-tree hierarchy is configured such that partitioning of the nodes into child nodes is stopped based on at least one of a predefined total number of nodes in the quad-tree hierarchy, and a predefined minimum surface area for each child triangle represented by a node of the quad-tree hierarchy. In other words, the quad-tree size and/or the maximum spatial resolution for providing correction data is/are fixed a-priori.

According to some embodiments, the correction data comprise metadata indicative of an accuracy range for the accuracy of respective synthetic data, particularly as a function of the tree level of the node representing the respective synthetic data.

In some embodiments, the correction data comprise basic data with respect to the reference stations. In particular, thanks to the quad-tree data format, basic data of the reference stations can be provided as a triangulation formed from the reference site coordinates without subsequent tessellation.

A further embodiment is characterized in that the step of providing the correction data comprises a selection of synthetic data based on an accuracy criterion and/or based on a maximum tree level of the quad-tree hierarchy, particularly wherein only synthetic data with respect to one of the tree levels are selected.

In some embodiments, the invention further relates to a network-RTK network element, e.g. a network-RTK server, comprising a computing unit and communication means, wherein the network-RTK network element is configured for carrying out the method according to any one of the embodiments described above.

In some embodiments, the invention also relates to a computer program product comprising program code, which is stored on a tangible, non-transient machine-readable medium (e.g., computer memory device) or embodied by an electromagnetic wave comprising a program code segment, and which has computer-executable instructions for performing, particularly when run on a computing unit (e.g., computer having a processor and the memory device) of a network-RTK network element as descried above, at least the following steps: reading basic data with respect to reference stations of a GNSS network-RTK system, the basic data for each of the reference stations respectively indicating influences on a signal propagation exerted by the atmosphere on a satellite signal of a GNSS associated with the respective reference station; reading definition data of a base triangulation or determining a base triangulation, the base triangulation enclosing at least part of the reference stations; subdividing the base triangulation into child triangles by means of a recursive division of parent triangles into four child triangles; determining synthetic data for each of the child triangles based on a triangulation algorithm applied to the basic data such that the synthetic data represent a gridded representation of the basic data; and providing access to correction data, wherein the correction data comprise at least part of the synthetic data arranged in a quad-tree hierarchy.

In some embodiments, the invention further relates to a network-RTK rover, e.g. a network-RTK client, with a computing unit and communication means configured for receiving network-RTK data, wherein the network-RTK rover is configured for determining a position based on GNSS data associated with a satellite signal of a GNSS, wherein a correction of the GNSS data is carried out based on the network-RTK data in order to take into account influences on a signal propagation exerted by the atmosphere on the satellite signal. The network-RTK rover is configured for receiving correction data as described above, the correction data being the network-RTK data, for decoding the quad-tree hierarchy as it is described above and for providing from the correction data a reconstruction of at least a fraction of the child triangles with corresponding synthetic data as described above, and for carrying out the correction based on the reconstruction.

In some embodiments, the network-RTK rover may be configured for reading the metadata within the correction data as described with respect to the above method, and/or for reading the synthetic and/or basic data within the correction data as described with respect to the above method.

In some embodiments, the network-RTK rover is configured for determining an accuracy of the correction from the tree levels of nodes of the quad-tree hierarchy.

In a further embodiment, the network-RTK rover is configured for requesting the correction data based on an accuracy criterion for the synthetic data and/or based on a maximum tree level of the quad-tree hierarchy, particularly for requesting only synthetic data with respect to one of the tree levels.

In some embodiments, the invention further relates to a computer program product comprising program code, which is stored on a machine-readable medium or embodied by an electromagnetic wave comprising a program code segment, and which has computer-executable instructions for performing, particularly when run on a computing unit of a network-RTK device described above, at least the following steps: reading GNSS data associated with a satellite signal of a GNSS; reading correction data as they are described above; decoding the quad-tree hierarchy as it is described above and providing from the correction data a reconstruction of at least a fraction of the child triangles with corresponding synthetic data as described above; and correcting the GNSS data based on the reconstruction, namely correcting influences on a signal propagation exerted by the atmosphere on the satellite signal based on the reconstruction.

In some embodiments, the invention further relates to a GNSS network-RTK system, configured for carrying out the method according to any one of the embodiments described above, with at least a network-RTK network element as described above, and at least a network-RTK rover according to any one of the embodiments described above.

BRIEF DESCRIPTION OF THE DRAWINGS

The GNSS network-RTK system according to the invention is described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention. Specifically.

FIG. 1 shows an exemplary embodiment of a GNSS network-RTK system according to the invention, comprising a network-RTK network element 1 that receives formatted raw GNSS measurements for a set of satellites 2 plus other ancillary information from three or more reference stations 3 covering a region of service 4, e.g. a province, a country, or a continent. The network-RTK network element 1 comprises a computing unit 5 configured for estimating the line-of-sight atmospheric delays associated with each reference station 3 within the region of service 4, wherein the computing unit 5 is further configured for the definition and recursive division of a base triangulation, e.g. based on one or a plurality of base triangles 6, for determining synthetic data for the child triangles of the recursive division, and for deriving correction data 7 based on the synthetic data being stored in quad-tree hierarchy.

Figure 1:
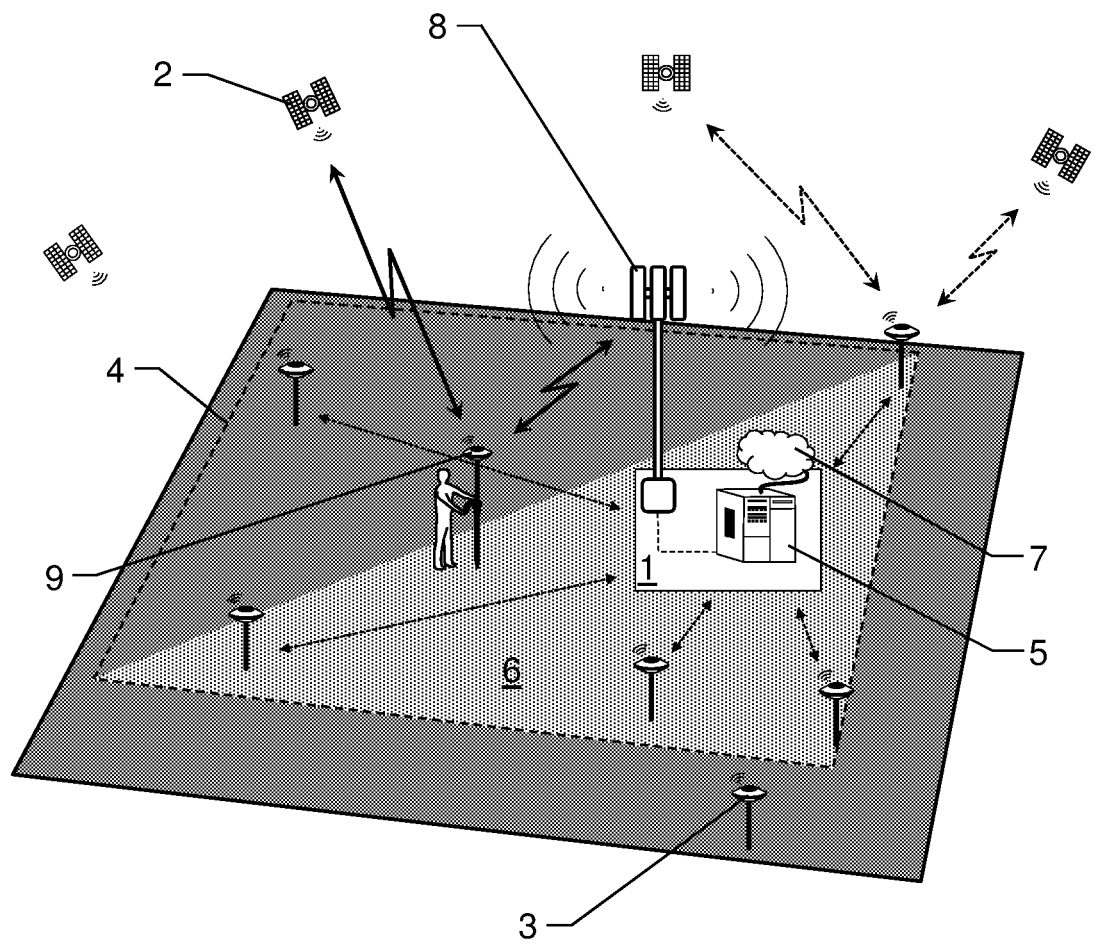
FIG. 1: an exemplary embodiment of a GNSS network-RTK system according to the invention.

The network-RTK network element 1 further comprises communication means 8 configured for transmission of the correction data 7 to a network-RTK rover 9, wherein the network-RTK rover 9 is configured for decoding the quad-tree hierarchy in order to derive appropriate correction data to be applied in GNSS positioning carried out at its current location. In other words, the network-RTK rover 9 is configured for decoding the correction data and for interpolating the atmospheric delay for any arbitrary point within a base triangle 6 using the same interpolation functions used for the initial generation of the correction data.

Figure 2:
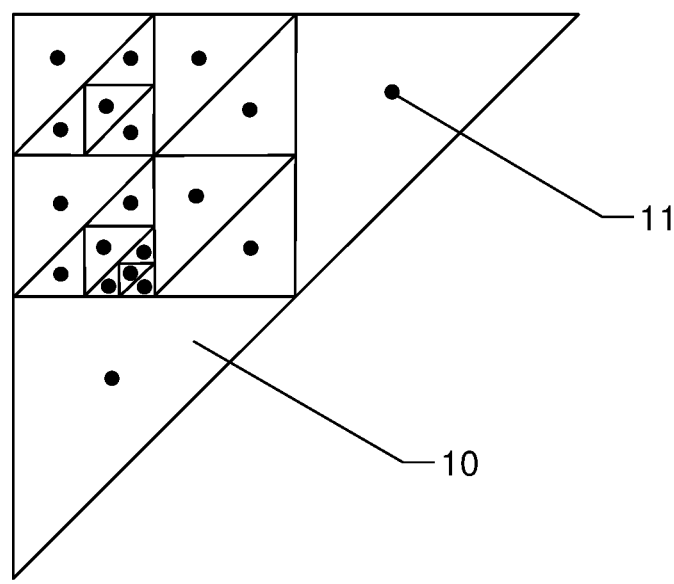
FIG. 2: an exemplary tessellation of a base triangle into child triangles.
Figure 3:
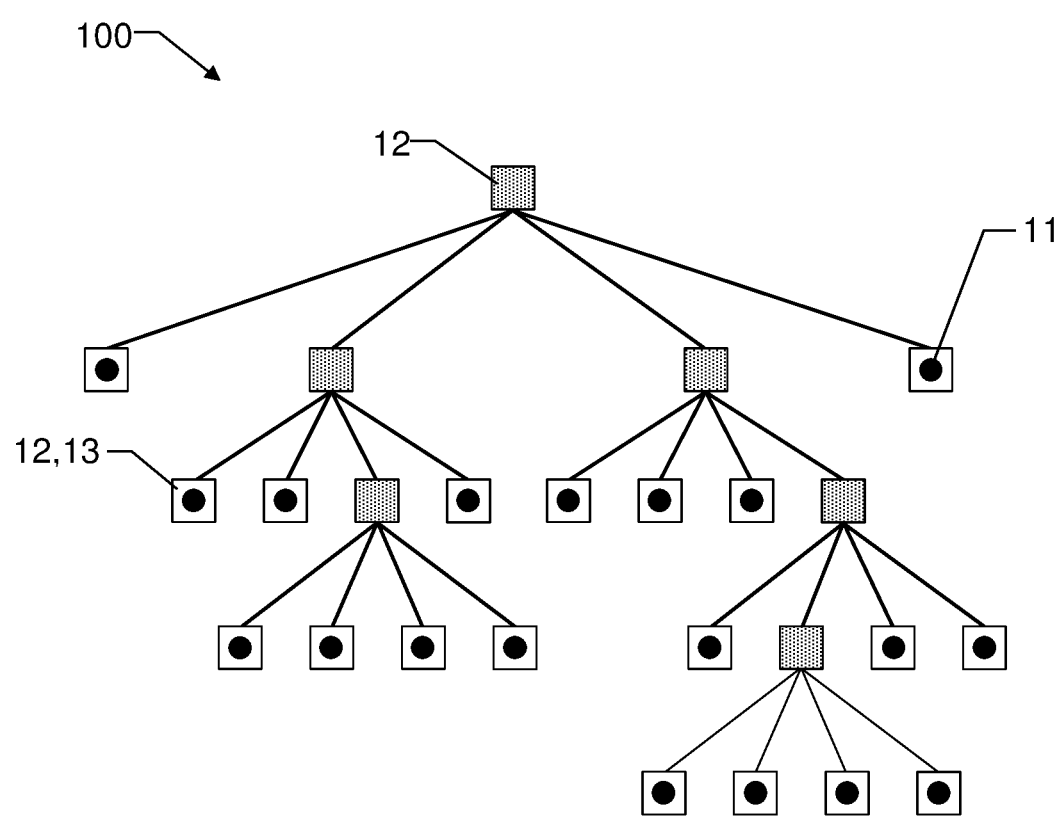
FIG. 3: an exemplary quad-tree structure corresponding to the tessellation of the base triangle of FIG. 2.

FIGS. 2 and 3 exemplarily illustrate the storage of the correction data according to a quad-tree hierarchy, wherein FIG. 2 shows a tessellation of a single base triangle into child triangles 10, wherein synthetic data points 11 are assigned to the child triangles 10 according to the quad-tree structure 100 depicted by FIG. 3.

In a quad-tree each node 12 has exactly four or zero children (child nodes), wherein quad-trees can be used to partition a two-dimensional space by recursively subdividing it into four areas 10, each area being assigned to a node 12 of the tree structure. So called leaf nodes 13 represent a unit of information, which may be defined differently depending on the application, e.g. wherein the unit of information is defined to represent correction data of a desired quality and/or correction data associated with a minimum spatial resolution to be achieved. Except for leaf nodes 13 and areas corresponding to leaf nodes, the areas 10/nodes 12 are further subdivided a number of times as determined by a given set of criteria, which may vary for different applications.

The tree directory follows the spatial decomposition of the quad-tree, wherein the data in the tree-pyramid can be stored compactly in an array as an implicit data structure, similar to the way a complete binary tree can be stored compactly in an array.

According to the invention, the quad-tree 100 is based upon a unique base level triangulation of a base primitive defined by a set of arbitrary points, e.g. the base primitive being a triangle, a square, or a polygon of more than four points. The arbitrary points may represent the physical coordinates of reference stations 3 (FIG. 1) or an arbitrary set of base level vertices for gridded data.

Based on the base primitive, a base triangulation is defined, e.g. as indicated by FIG. 1, where a base triangle 6 is defined within a square region of service 4 (base primitive).

Each base triangle is then recursively subdivided into four child triangles 10 as depicted by FIG. 2, wherein data associated with the child triangles are stored in a quad-tree 100 as depicted by FIG. 3, wherein data at each child level are stored differentially to the parent level. The format allows for data at the child level and all subsequent levels to be removed from the data stream on a per vertex basis. This enables higher compression to be achieved and also allows for the encoding of spatially variable precision across the modelled region of service as indicated by the distribution of data points 11, i.e. units of information, depicted by FIG. 2, wherein the data points 11 correspond to leaf nodes 13 in the quad-tree depicted by FIG. 3. Thus, the variable distribution of reference stations and/or precision requirements can be mapped by the quad-tree without generating data overhead.

Figure 4:
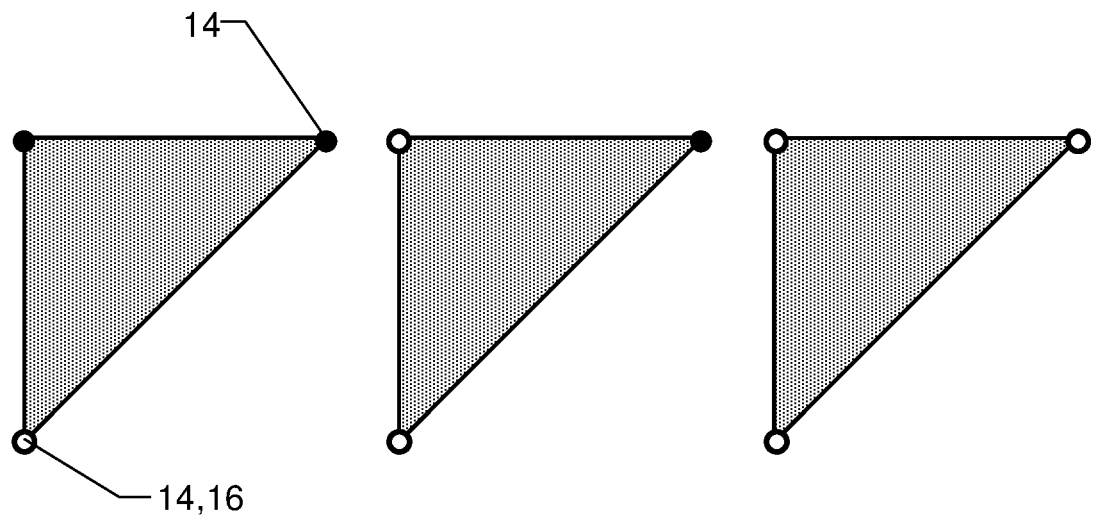
FIG. 4: exemplary triangle faces of three different parent levels with corresponding bounding vertices.
Figure 5:
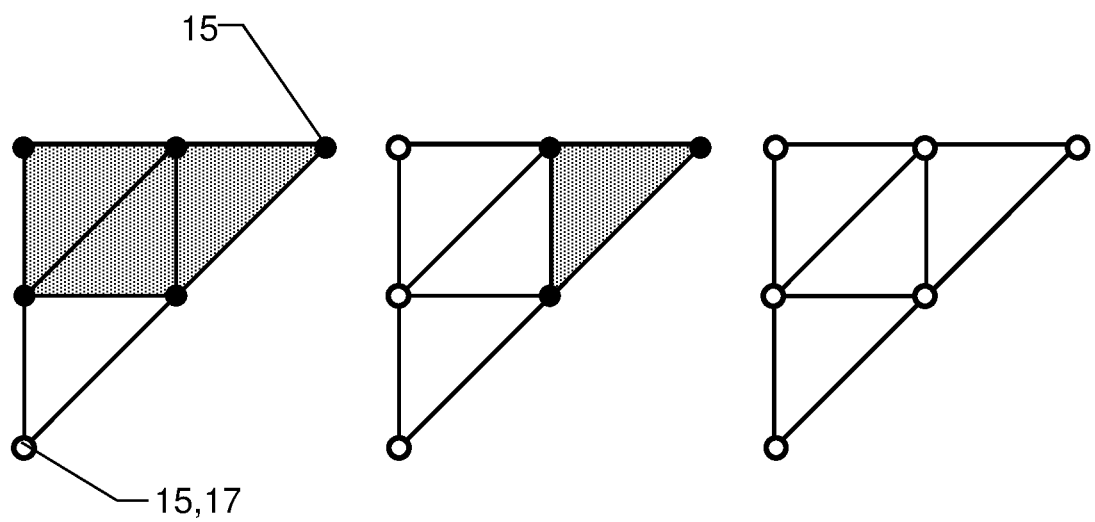
FIG. 5: resulting child levels corresponding to the parent level triangles of FIG. 4, with interpolated vertex values.

FIGS. 4 and 5 show an exemplary way for defining the quad-tree hierarchy, wherein values of NaN for the bounding vertex indices of parent triangles are used for removing child triangles and associated nodes from the quad-tree. NaN, standing for Not a Number, is a numeric data type value representing an undefined value that is used to define the quad-tree hierarchy.

FIG. 4 depicts triangle faces of three different parent levels and FIG. 5 depicts corresponding resulting child levels. Here, tessellation involves a uniform subdivision of each of the parent level triangle faces in sequence.

Each triangle face may be defined by its three bounding vertex indices 14, wherein data values for the next tessellation level at each unique vertex index 15 are stored as the difference from the average of the data values associated with the parent level vertices 14. Data for each vertex is stored sequentially in the output data stream, firstly for the base level and then for subsequent child levels.

Data values set to NaN are used to define the quad-tree hierarchy. A parent level vertex 16 having a value of NaN implies that a child face associated with this vertex 16 is removed from the quad-tree. In the case of interpolation between a pair of vertices 14 on the parent level consisting of a single vertex 16 with NaN, the NaN is treated as zero. For interpolation where two parent vertices 16 are NaN then no child vertex exists. Accordingly, FIG. 5 shows the child faces that are encoded for the three different parent levels of FIG. 4 by interpolated vertex values 15, wherein for some child vertex indices 17 no data are transmitted.

The maximum level at which data are encoded can be used to provide an estimate of the precision of the data values at each vertex. Note that the ordering of vertices in the encoded stream is invariant on their existence.

Although the invention is illustrated above, partly with reference to some preferred embodiments, it must be understood that numerous modifications and combinations of different features of the embodiments can be made. All of these modifications lie within the scope of the appended claims.

The invention claimed is:

1. A method for providing correction data in a GNSS network-RTK system having reference stations, the method comprising:

obtaining basic data with respect to the reference stations, the basic data for each of the reference stations respectively indicating influences on a signal propagation exerted by the atmosphere on a satellite signal of a GNSS associated with the respective reference station, defining a base triangulation that encloses at least part of the reference stations, subdividing the base triangulation into child triangles by means of a recursive division of parent triangles into four child triangles, determining synthetic data for each of the child triangles based on a triangulation algorithm applied to the basic data such that the synthetic data represent a gridded representation of the basic data, and providing access to correction data, wherein:

the correction data comprise at least part of the synthetic data, the at least part of the synthetic data are arranged in a quad-tree hierarchy of different tree levels comprising a plurality of nodes, and the correction data are configured such that for each child node of the plurality of nodes differential data are provided with respect to data of its parent node, a parent node of a respective child node being a node of a previous tree level of the different tree levels which was partitioned into those child nodes which comprise the respective child node.

2. The method according to claim 1, wherein the correction data comprise at least the coordinates of the vertices of the base triangulation.

3. The method according to claim 1, wherein for each of the tree levels each node comprises exactly four or zero child nodes, and wherein:
nodes of a first tree level comprise synthetic data corresponding to the vertices of those child triangles which were created in a first step of the recursive division,
nodes of a second or further tree level respectively comprise synthetic data corresponding to the vertices of those child triangles which were created in a second or further step of the recursive division,
the synthetic data are divided into a group of valid data and a group of invalid data, and
each node of the plurality of nodes is partitioned into child nodes only in case at least one of its child nodes would comprise synthetic data of the group of valid data.

4. The method according to claim 3, wherein:
the synthetic data are divided into the group of valid data and the group of invalid data by marking part of the synthetic data as invalid, in case an uncertainty of the at of the synthetic data exceeds a pre-defined uncertainty threshold.

5. The method according to claim 1, wherein the quad-tree hierarchy is configured such that partitioning of the plurality of nodes into child nodes is stopped based on at least one of:
a predefined total number of nodes in the quad-tree hierarchy, and
a predefined minimum surface area for each child triangle represented by a node of the quad-tree hierarchy.

6. The method according to claim 1, wherein the correction data comprise at least one of:
metadata indicative of an accuracy range for the accuracy of respective synthetic data, and
basic data with respect to the reference stations.

7. The method according to claim 6, wherein the correction data comprises metadata indicative of an accuracy range for the accuracy of respective synthetic data as a function of the tree level of a node of the plurality of nodes representing the respective synthetic data.

8. The method according to claim 1, wherein the step of providing access to the correction data comprises a selection of synthetic data based on an accuracy criterion and/or based on a maximum tree level of the quad-tree hierarchy.

9. The method according to claim 8, wherein only synthetic data with respect to one of the tree levels are selected.

10. The method according to claim 4, wherein the uncertainty of the part of the synthetic data is derived based on at least one of:
an uncertainty in the basic data,
an interpolation uncertainty of the triangulation algorithm, and
a spatial distance of the child triangle corresponding to the part of the synthetic data to the closest reference station.

11. A network-RTK network element comprising a computing unit and communication means, wherein the network-RTK network element is configured to carry out the method according to claim 1.

12. A GNSS network-RTK system, configured to carry out the method according to claim 1, with
at least a network-RTK network element, and
at least a network-RTK rover.

13. A computer program product comprising program code, which is stored on a non-transient machine-readable medium, comprising a program code segment, and which has computer-executable instructions for performing, when run on a computing unit of a network-RTK network element according to claim 11, at least the following steps:
reading basic data with respect to reference stations of a GNSS network-RTK system, the basic data for each of the reference stations respectively indicating influences on a signal propagation exerted by the atmosphere on a satellite signal of a GNSS associated with the respective reference station,
reading definition data of a base triangulation or determining a base triangulation, the base triangulation enclosing at least part of the reference stations,
subdividing the base triangulation into child triangles by means of a recursive division of parent triangles into four child triangles,
determining synthetic data for each of the child triangles based on a triangulation algorithm applied to the basic data such that the synthetic data represent a gridded representation of the basic data, and
providing access to correction data, wherein
the correction data comprise at least part of the synthetic data,
the at least part of the synthetic data are arranged in a quad-tree hierarchy comprising a plurality of nodes, and
the correction data are configured such that for each child node of the plurality of nodes differential data are provided with respect to data of its parent node, a parent node of a respective child node being a node of a previous tree level of the different tree levels which was partitioned into those child nodes which comprise the respective child node.

14. A network-RTK rover for a GNSS network-RTK system, with a computing unit and communication means configured to receive network-RTK data, wherein the network-RTK rover is configured to determine a position based on GNSS data associated with a satellite signal of a GNSS, wherein a correction of the GNSS data is carried out based on the network-RTK data in order to take into account influences on a signal propagation exerted by the atmosphere on the satellite signal, wherein the network-RTK rover is configured:
to receive correction data defined according to claim 13, the correction data being the network-RTK data,
to decode the quad-tree hierarchy,
to provide from the correction data a reconstruction of at least a fraction of the child triangles with corresponding synthetic data, and
to carry out the correction based on the reconstruction.

15. The network-RTK rover according to claim 14, wherein the network-RTK rover is configured to determine an accuracy of the correction from the tree levels of nodes of the quad-tree hierarchy.

16. The network-RTK rover according to claim 14, wherein the network-RTK rover is configured to request the correction data based on an accuracy criterion for the synthetic data and/or based on a maximum tree level of the quad-tree hierarchy.

17. The network-RTK rover according to claim 16, wherein the network-RTK rover is configured to request only synthetic data with respect to one of the tree levels.

18. A computer program product comprising program code, which is stored on a non-transient machine-readable medium comprising a program code segment, and which has computer-executable instructions for performing, when run on a computing unit of a network-RTK rover according to claim 14, at least the following steps:
- reading GNSS data associated with a satellite signal of a GNSS,
- reading correction data,
- decoding the quad-tree hierarchy and providing from the correction data a reconstruction of at least a fraction of the child triangles with corresponding synthetic data, and
- correcting the GNSS data based on the reconstruction.

* * * * *